Patented Aug. 20, 1935

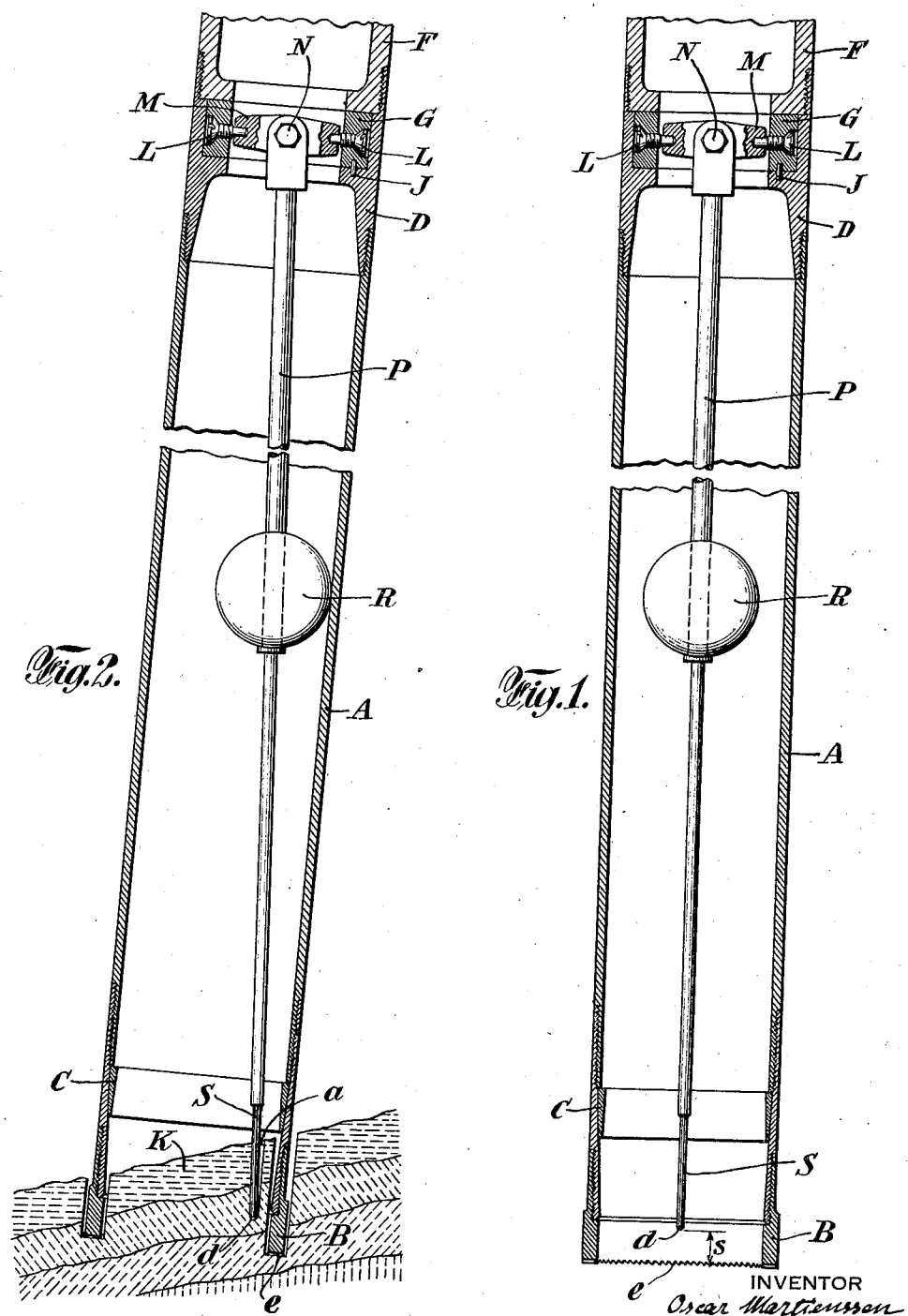

2,011,979

UNITED STATES PATENT OFFICE 2,011,979

MEANS FOR MARKING CORES IN BORE HOLES

Oscar Martienssen, Kiel, Germany

Application November 20, 1934, Serial No. 753,887
In Germany January 29, 1934

3 Claims. (Cl. 255—72)

In order to obtain in deep bore holes information about the nature of the traversed strata and the directions of their strike and dip, it is customary to draw out cores which are raised by means of a core tube. While the material of the obtained core gives directly information about the nature of the strata, it is necessary, in order to gain knowledge of the direction of the different strata, to know first the inclination of the bore hole with respect to the vertical at the point at which the core was broken off, and second how the core, before breaking it off, was disposed with respect to the compass direction. Then the core can be easily oriented above ground with respect to the direction of its maximum inclination, and from the strata visible in the core material the direction of dip and strike of the geological strata of the territory can be recognized.

From the prior art a number of instruments are known which are intended to serve the above named purpose. So far as I am aware, these instruments serve this purpose only partly.

For instance, in one class of instruments a compass needle is lowered into the bore hole with the core tube, which first adjusts itself in the ordinary way in the direction of the magnetic meridian but which, before the core is broken off, is locked in various suitable manners with respect to the position of the core, so that when the core is raised and placed with the needle in the magnetic meridian, the direction of the dip and strike of the strata can be observed on the core. This type of method has the disadvantage that the core tube material and all accessory parts must not consist of ferrous material, so as not to disturb the natural positioning of the magnet needle. And further, it cannot be said with certainty that the magnet needle, on being lowered into certain strata, is not unduly influenced by the composition of the strata so that its presumed azimuth is in reality different from that which the needle assumes above ground.

There are other devices in accordance with which the core is chisel-marked on its upper face in a certain direction, which presumes that the chisel, when impressing the marking, has maintained the same direction in which it was lowered into the bore hole. This maintenance of direction is very difficult, if possible at all.

Lastly, devices for this purpose are known in which a gyro compass is used instead of a magnetic compass in order to avoid the difficulties involved with the use of the latter. With the use of the gyro compass, the core, after it has been bored, is eccentrically drilled on its face by means of a small drill, this drill being positioned in the compass direction by the gyro compass, and thus the direction is registered in which this marking, counting from the center of the core, has occurred, or else the eccentric bore is made directly in the direction of the north.

This method, which in itself avoids the defects of the other methods mentioned, has, however, other disadvantages which arise when sludge still rests in the bottom of the bore hole, so that the apparatus is apt to rest on the sludge and that the drill buries itself only in the latter and does not reach the face of the core. Aside from the direction determination of the core by any of the above methods, an additional measurement is necessary which determines the orientation and the amount of dip of the bore hole at the point at which the core is broken off, so as to enable the observer to completely replace the core above ground into the position which it had in the bore hole.

My invention avoids all these difficulties resulting from attempting to mark the core in a compass direction before it is broken off, because I rely upon the marking of the core in relation to the azimuth of the plane of greatest inclination of the bore hole axis independent of any compass. The azimuth of this plane of maximum inclination can be determined with certainty by means of any inclination meter already known in the art, which may include a gyro compass, or a rigid drill string for orientation purposes. The angle of inclination of dip being recorded by my marking device, and the azimuth of the plane of said dip being discovered by said known means, obviously the core may be placed above ground in the same relative position as to azimuth and dip as it had before it was cut. Or the operator can clearly imagine it oriented in its uncut position from this data.

The direction of the maximum inclination of the bore hole is always also the direction of the maximum inclination of the core tube, and the direction of this inclination can be marked in the core itself without difficulty, so that the marking applies as well to the core as to the bore hole.

My invention is illustrated in the accompanying drawing, in which

Fig. 1 represents a vertical section across a core tube with suspended marking pendulum;

Figure 2 is a scheme drawing for representing the core marking by the pendulum.

Referring now to the drawing:

In Figures 1 and 2 A is the core tube, B the drilling crown of it and C the spring collar for catching the core in drawing up the core tube. On the core tube is screwed a supporting piece D to which is joined the tube piece F, being connected with the drill pipe.

In this supporting piece lies an iron ring G, which, by means of a pin J, is secured from distortions relative to the core tube.

At this ring, the pendulum P is suspended cardanically by means of the two bearing screws L, the bronze beam M and the bearing axle N so that the pendulum may oscillate in all directions relative to the middle axis of the core tube.

The pendulum is weighted by means of a lead weight R and terminates in a little borer S. This one may be a simple twist drill when having soft or middle-soft formation, or a volomit or diamond drill at hard formation.

If such a core tube as shown in Figure 2 is lowered into the bore hole for free boring and for breaking off the core, and if the bore hole is inclined to the vertical—which is practically always the case—the point of the pendulum will not be positioned in the central axis of the core tube but will be radially shifted. If the inclination of the bore hole is very considerable, the weight will even rest against the wall of the tube, namely, against that tube portion which is located opposite to the direction in which the bore hole deviates from the vertical direction. This position of the pendulum is maintained also in case the core tube is turned. If thus the core tube is lowered to the foot of the bore hole and, by turning around its axis, a core is freely bored, the pendulum together with the drill turns around its axis and the point of the pendulum penetrates into the upper face of the core and, as it were, impales the core on the pendulum. Thus the point "a" at which the pendulum penetrates into the upper core face is situated on the side of the core face which is located opposite to the direction in which the bore hole dips. If now the core, after it has been raised above ground, is taken out, the small boring on its face, made by the pendulum, will indicate, owing to its known inclination, the direction in which it was located before it was broken off. In case of hard core material, the pendulum point may also be broken off before the core is removed from the core tube.

The above described method and device has the advantage that the bottom of the bore hole does not have to be cleared of all sludge before the core is broken off and drawn up. When the core tube is lowered, the pendulum point penetrates through the sludge and the core is struck with certainty by the pendulum point so long as the core is freely bored down a distance at least equal to the distance $s$ between the pendulum point $d$ and the drill crown B.

This method of direction determination has the further advantage that for obtaining marked cores the latter may be broken off and drawn without any preliminary measurement, and that by a subsequent measurement of the bore hole inclination above ground by means of a delicate bore inclination meter, the orientation of all cores drawn during the boring operation can be made in one complete series. This method is, therefore, extremely simple and particularly suited for boring deep holes.

I claim:—

1. In means for orienting the inclined position of the core in bore holes, a core tube having means permanently attached to its interior and responsive to the direction of maximum inclination of the bore hole, and an element forming part of said means for impressing upon the upper core face during the core boring a marking eccentrically of the core axis and determined by the direction which said responsive means assumes due to the bore hole inclination.

2. In means for orienting the inclined position of the core in bore holes, a core tube containing a cardanically suspended weighted pendulum, and a penetrating implement at the lower end of said pendulum adapted to impress a marking upon the upper core face eccentrically of the core axis and determined by the position which the pendulum assumes due to the inclination of the bore hole.

3. In means for orienting the inclined position of the core in bore holes, a core tube containing a cardanically suspended pendulum weighted by a heavy inelastic material, and a penetrating implement at the lower end of said pendulum adapted to impress a marking upon the upper core face eccentrically of the core axis and determined by the position which the pendulum assumes due to the inclination of the bore hole.

OSCAR MARTIENSSEN.